US008811312B2

(12) United States Patent
Seok (10) Patent No.: US 8,811,312 B2
(45) Date of Patent: Aug. 19, 2014

(54) METHOD AND APPARATUS OF ACCESSING CHANNEL IN WIRELESS COMMUNICATION SYSTEM

(75) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 138 days.

(21) Appl. No.: 13/002,301

(22) PCT Filed: Jul. 1, 2009

(86) PCT No.: PCT/KR2009/003572
§ 371 (c)(1),
(2), (4) Date: Dec. 30, 2010

(87) PCT Pub. No.: WO2010/002183
PCT Pub. Date: Jan. 7, 2010

(65) Prior Publication Data
US 2011/0096747 A1    Apr. 28, 2011

Related U.S. Application Data

(60) Provisional application No. 61/077,864, filed on Jul. 2, 2008, provisional application No. 61/159,791, filed on Mar. 12, 2009.

(30) Foreign Application Priority Data

Dec. 12, 2008    (KR) .................. 10-2008-0126486

(51) Int. Cl.
*H04W 4/00* (2009.01)
*H04W 72/02* (2009.01)
*H04W 84/12* (2009.01)
*H04W 72/04* (2009.01)
*H04W 8/24* (2009.01)
*H04W 48/16* (2009.01)

(52) U.S. Cl.
CPC .............. *H04W 72/02* (2013.01); *H04W 84/12* (2013.01); *H04W 72/04* (2013.01); *H04W 8/24* (2013.01); *H04W 48/16* (2013.01)
USPC ........... 370/329; 370/252; 370/338; 370/337; 370/341; 375/225

(58) Field of Classification Search
CPC combination set(s) only.
See application file for complete search history.

(56) References Cited

U.S. PATENT DOCUMENTS 5,177,739 A * 1/1993 Basnuevo et al. ............. 370/449
5,533,024 A   7/1996 Owada
(Continued)

FOREIGN PATENT DOCUMENTS

CN    1857016    11/2006
RU    2319311    3/2008
(Continued)

OTHER PUBLICATIONS

Ericsson, "A discussion on some technology components for LTE-Advanced," R1-082024, TSG-RAN WG1 #53, May 2008, XP-050110365.
(Continued)

*Primary Examiner* — Ian N Moore
*Assistant Examiner* — Eric H Wang
(74) *Attorney, Agent, or Firm* — Lee, Hong, Degerman, Kang & Waimey (57) ABSTRACT

A method and apparatus of accessing a channel in a wireless communication system is provided. The method includes receiving a first frame including configuration information on a channel allocated from a bandwidth including a primary channel, a secondary channel and an extension channel from an access point (AP), and transmitting a second frame to the AP by using the allocated channel. The configuration information includes an extension channel offset element field that sets the extension channel as the offset of the primary channel.

2 Claims, 6 Drawing Sheets

(56) References Cited

U.S. PATENT DOCUMENTS

| | | |
|---|---|---|
| 6,636,737 B1 | 10/2003 | Hills et al. |
| 7,236,782 B2 | 6/2007 | Utsunomiya et al. |
| 2005/0124335 A1 | 6/2005 | Cave et al. |
| 2006/0270339 A1 | 11/2006 | Mahany |
| 2007/0104137 A1* | 5/2007 | Tang .............................. 370/329 |
| 2007/0171858 A1 | 7/2007 | Grandhi et al. |
| 2007/0195744 A1 | 8/2007 | Solomon et al. |
| 2007/0266157 A1* | 11/2007 | Xhafa et al. .................. 709/225 |
| 2008/0192644 A1* | 8/2008 | Utsunomiya et al. ......... 370/252 |

FOREIGN PATENT DOCUMENTS

| | | |
|---|---|---|
| WO | 2006/045097 | 4/2006 |
| WO | 2007/106621 | 9/2007 |

OTHER PUBLICATIONS

Qi Wang, "Channel Switch Announcement with Extension," IEEE 802.11-06/1700r0, Nov. 2006, 11 pages.

Canadian Intellectual Property Office Application Serial No. 2,729,774, Office Action dated Mar. 5, 2013, 4 pages.

Russian Federation Federal Service for Intellectual Property Application Serial No. 2011102814/07, Notice of Allowance dated Sep. 21, 2012, 15 pages.

The State Intellectual Property Office of the People's Republic of China Application Serial No. 200980129733.2, Office Action dated Dec. 18, 2013, 6 pages.

Canadian Intellectual Property Office Application Serial No. 2,729,774, Office Action dated Sep. 25, 2013, 3 pages.

\* cited by examiner

METHOD AND APPARATUS OF ACCESSING CHANNEL IN WIRELESS COMMUNICATION SYSTEM

This application is the National Stage filing under 37 U.S.C. 371 of International Application No. PCT/KR2009/003572, filed on Jul. 1, 2009, which claims the benefit of earlier filing date and right of priority to Korean Patent Application No. 10-2008-0126486, filed on Dec. 12, 2008, and also claims the benefit of U.S. Provisional Application Ser. Nos. 61/159,791, filed on Mar. 12, 2009, and 61/077,864, filed on Jul. 2, 2008, the contents of which are all hereby incorporated by reference herein in their entirety.

TECHNICAL FIELD

The present invention relates to a wireless communication, and more particularly, to a method and apparatus of accessing a channel in a wireless communication system.

BACKGROUND ART

With the advancement of information communication technologies, various wireless communication technologies have recently been developed. A wireless local access network (WLAN) is a technology whereby super high-speed internet access is possible in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. Initially, WLAN used a frequency of 2.4 GHz to support a data rate of 1 to 2 Mbps by using frequency hopping, spread spectrum, infrared ray communication, etc. Recently, the WLAN can support a data rate of up to 54 Mbps by using orthogonal frequency division multiplexing (OFDM). In addition, the IEEE 802.11 is developing or commercializing standards of various technologies such as quality of service (QoS) improvement, access point (AP) protocol compatibility, security enhancement, radio resource measurement, wireless access in vehicular environments, fast roaming, mesh networks, inter-working with external networks, wireless network management, etc.

The IEEE 802.11b standard supports a data rate of up to 11 Mbps (bits per second) by using a frequency band of 2.4 GHz. The IEEE 802.11a standard uses a frequency band of 5 GHz instead of the frequency band of 2.4 GHz and thus significantly reduces influence of interference. The IEEE 802.11a standard has improved the data rate to up to 54 Mbps by using the OFDM technology. The IEEE 802.11n standard provides increased network speed and reliability, extended coverage.

Basic access mechanism of an IEEE 802.11 is a carrier sense multiple access with collision avoidance (CSMA/CA) combined with binary exponential backoff. The CSMA/CA mechanism is also referred to as a distributed coordinate function (DCF) and basically employs a "listen before talk" access mechanism. A station (STA) listens a wireless medium before starting transmission. As a result of listening, if it is sensed that the wireless medium is not in use, the listening STA starts its transmission. Otherwise, if it is sensed that the wireless medium is in use, the STA does not start its transmission but enters a delay duration determined by the binary exponential backoff algorithm. The CSMA/CA channel access mechanism is not so efficient since throughput at the MAC layer provides only 50 to 60% of throughput at the physical layer.

IEEE 802.11 VHT (Very High Throughput) is one of WLAN systems which have been recently proposed to support throughput of higher than 1 Gbps. Two kinds of VHT system are independently progressed: one is IEEE 802.11ac below 6 GHz band and another is IEEE 802.11ac for 60 GHz band.

The VHT system is expected to use bandwidths broader than at least 60 MHz. A AP simultaneously transmit data at different frequencies to multiple STAs to increase the overall throughput.

A technique for efficiently operating a wideband VHT system is required.

DISCLOSURE OF INVENTION

Technical Problem

The present invention provides a method and apparatus of accessing a channel to support wideband in a WLAN system.

Technical Solution

In an aspect, a method of accessing a channel in a wireless communication system is provided. The method includes receiving a first frame including configuration information on a channel allocated from a bandwidth including a primary channel, a secondary channel and an extension channel from an access point (AP), and transmitting a second frame to the AP by using the allocated channel, wherein the primary channel and the secondary channel have bandwidths used by legacy stations and the configuration information includes an extension channel offset element field that sets the extension channel as the offset of the primary channel.

The configuration information may be an operation element and the first frame may correspond to one of a beacon frame, a probe response frame and an association response frame. The first frame may be a channel switch announcement frame.

In another aspect, a method of accessing a channel in a wireless communication system is provided. The method includes selecting a first channel from a plurality of narrowband channels, starting a backoff timer if the selected first channel is idle, confirming whether an unselected second channel is idle if the backoff timer is expired, and transmitting a frame through the first and second channels if the second channel is idle.

In still another aspect, a station for wireless communication includes a radio frequency (RF) unit to transmitting a radio signal, and a processor coupled with the RF unit and configured to select a first channel from a plurality of narrowband channels, start a backoff timer if the selected first channel is idle, confirm whether an unselected second channel is idle if the backoff timer is expired, and transmit a frame through the first and second channels if the second channel is idle.

Advantageous Effects

A wideband channel is managed and used through a plurality of narrowband channels, and thus the efficiency of radio resources can be improved and throughput can be increased.

MODE FOR THE INVENTION

Figure 1:
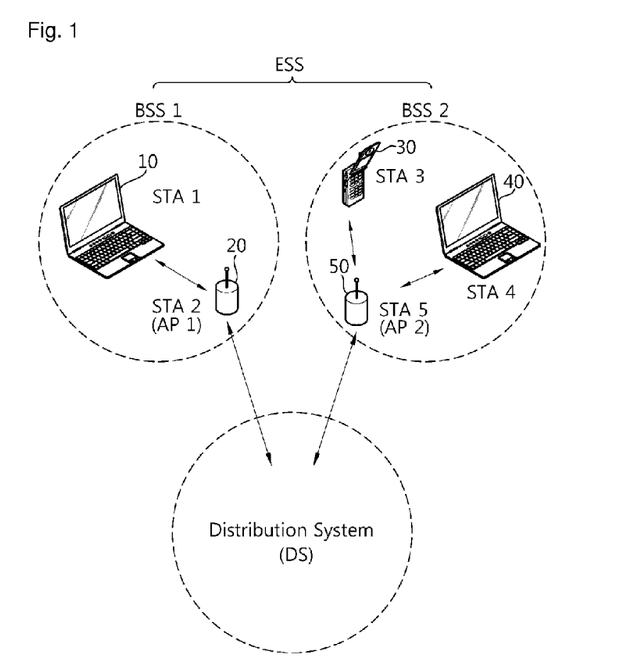
FIG. 1 is a schematic view showing an exemplary structure of a wireless local access network (WLAN) system to implement an embodiment of the present invention.

FIG. 1 is a schematic view showing an exemplary structure of a wireless local access network (WLAN) system to implement an embodiment of the present invention. The WLAN system includes one or more basis service sets (BSSs). The BSS is a set of stations (STAs) which are successfully synchronized to communicate with one another. The BSS can be classified into an infrastructure BSS and an independent BSS (IBSS). The infrastructure BSSs (BSS1 and BSS2) shown in FIG. 1 include STAs 10, 30 and 40, access points (APs) 20 and 50. The AP is a STA providing a distribution service. The APs 20 and 50 are connected by means of a distribution system (DS). The IBSS operates as Ad-hoc mode and does not include any AP. The IBSS constitutes a self-contained network since connection to the DS is not allowed. A plurality of infrastructure BSSs can be interconnected by the use of the DS. An extended service set (ESS) is a plurality of BSSs connected by the use of the DS. In the same ESS, a non-AP STA can move from on BSS to another BSS while performing seamless communication.

The STA is an arbitrary functional medium including a medium access control (MAC) and wireless-medium physical layer (PHY) interface conforming to the institute of electrical and electronics engineers (IEEE) 802. 11 standard. The STA may be an AP or a non-AP STA. A non-AP STA may be a portable terminal operated by a user. The non-AP STA may be simply referred to as an STA. The non-AP STA may be referred to as a wireless transmit/receive unit (WTRU), a user equipment (UE), a mobile station (MS), a mobile terminal, a mobile subscriber unit, etc. The AP is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. The AP may be referred to as a centralized controller, a base station (BS), a node-B, a base transceiver system (BTS), a site controller, etc.

A VHT (Very High Throughput) WLAN system aims to be reflected on one of IMT (International Mobile Telecommunication)-Advanced technologies corresponding to fourth-generation telecommunication standard. Accordingly, the VHT WLAN system is required to operate in IMT-Advanced candidate bands and the existing 2.4 GHz and 5 GHz bands.

The VHT WLAN system is required to use a bandwidth wider than at least 60 MHz in order to secure throughput higher than 1 Gbps. To segment a wideband into a plurality of narrowbands and use the narrowbands is efficient more than to use the wideband as a single channel in terms of backward compatibility and resource efficiency.

Hereinafter, a narrowband channel having a bandwidth of 20 MHz is referred to as a subchannel. A technique of binding three or four subchannels to support a bandwidth of 60 MHz or 80 MHz will now be described. The number of subchannels, the bandwidth of the subchannel and the overall bandwidth are exemplary purpose only.

Figure 2:
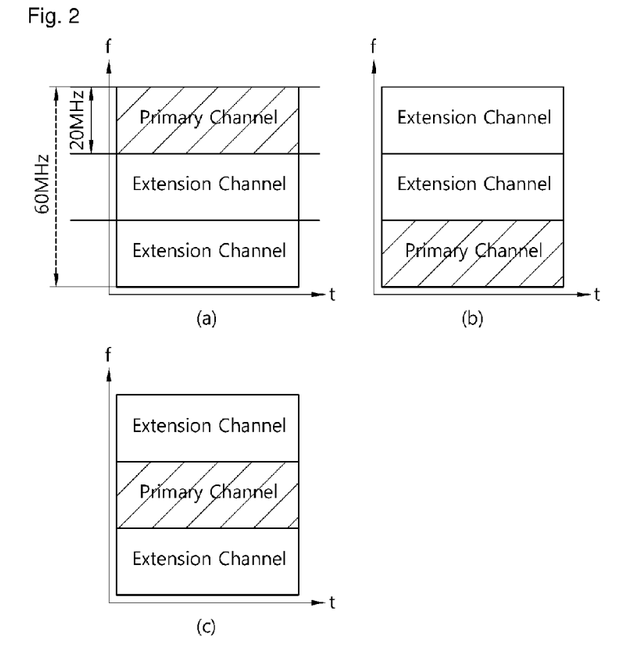
FIG. 2 illustrates exemplary channel management that combines three subchannels to support a bandwidth of 60 MHz.

FIG. 2 illustrates exemplary channel management that combines three subchannels to support a bandwidth of 60 MHz. The three subchannels include a primary channel and two extension channels. The primary channel is set in order to secure backward compatibility with STAs (hereinafter referred to as legacy STAs) supporting standards of lower than IEEE 802.11n using a bandwidth of 20 MHz. Legacy STAs supporting 20 MHz use the primary channel preferentially. STAs supporting 40 MHz or 60 MHz can use the primary channel, two extension channels and/or a combination thereof.

Subfigure (a) of FIG. 2 shows that the extension channels using 20 MHz are located in a frequency band lower than the primary channel. Here, the two 20 MHz extension channels can be set as a single 40 MHz extension channel. Subfigure (b) of FIG. 2 shows that the two extension channels are located in a frequency band higher than the primary channel. The two 20 MHz extension channels can be set as a single 40 MHz extension channel. Subfigure (c) of FIG. 2 shows that the primary channel is located between the two extension channels.

In (a) and (b) of FIG. 2, the multiple channels can be administrated by using the primary channel and the single 40 MHz extension channel contiguous to the primary channel. In (c) of FIG. 2, the multiple channels can be administrated by the primary channel and two 20 MHz extension channels contiguous to the primary channel.

An AP can set a subchannel among overall available channels as a primary channel and use the primary channel as a common channel for control signal. The AP can set a bandwidth of an extension channel to one of 20 MHz, 40 MHz and 60 MHz according to channel availability if a STA supports the extension channel.

Figure 3:
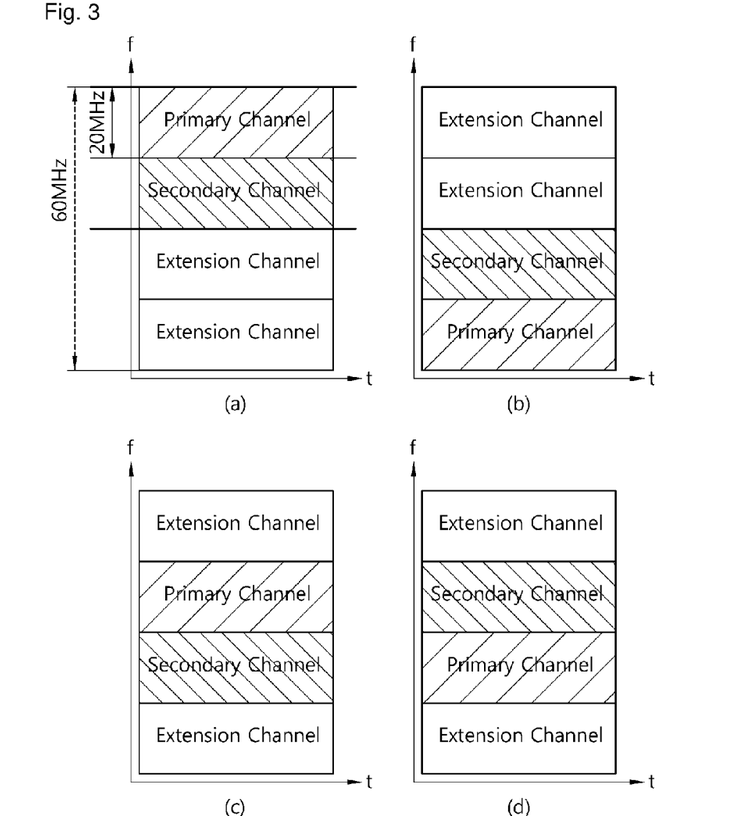
FIG. 3 illustrates exemplary channel management that combines four subchannels to support a bandwidth of 80 MHz.

FIG. 3 illustrates exemplary channel management that combines four subchannels to support a bandwidth of 80 MHz. The four subchannels include a primary channel, a secondary channel and two extension channels. The primary channel and the secondary channel are set in order to secure backward compatibility with legacy STAs supporting standards of lower than IEEE 802.11n using 40 MHz. Legacy STAs supporting 20 MHz preferentially use the primary channel and use the secondary channel when the primary channel is being used. Legacy STAs supporting 40 MHz preferentially use the primary channel and the secondary channel. STAs supporting bandwidths higher than 60 MHz can use the primary channel, the secondary channel, the extension channels and/or a combination thereof.

Subfigure (a) of FIG. 3 shows that the extension channels having 20 MHz are located in a frequency band lower than the primary channel and the secondary channel. The primary channel is located in the highest band and the secondary channel is located below the primary channel. Here, the two 20 MHz extension channels can be set as a single 40 MHz extension channel. Subfigure (b) of FIG. 3 shows that the 20 MHz extension channels are located in a frequency band higher than the primary channel and the secondary channel. The primary channel is located in the lowest band and the secondary channel is located above the primary channel. Here, the two 20 MHz extension channels can be set as a single 40 MHz extension channel. Subfigure (c) of FIG. 3 shows that the primary channel and the secondary channel are located between the two extension channels. The primary channel is located in a band higher than the secondary channel. Subfigure (d) of FIG. 3 shows that the primary channel and the secondary channel are located between the two extension channels. The primary channel is located in a band lower than the secondary channel.

In (a) and (b) of FIG. 3, the multiple channels can be administrated by using the primary channel, the secondary channel and a extension channel having 40 MHz. In (c) and (d) of FIG. 3, the multiple channels can be administrated by using the primary channel, the secondary channel and two extension channels each having 20 MHz.

A method of setting and changing multiple channels will now be described.

Figure 4:
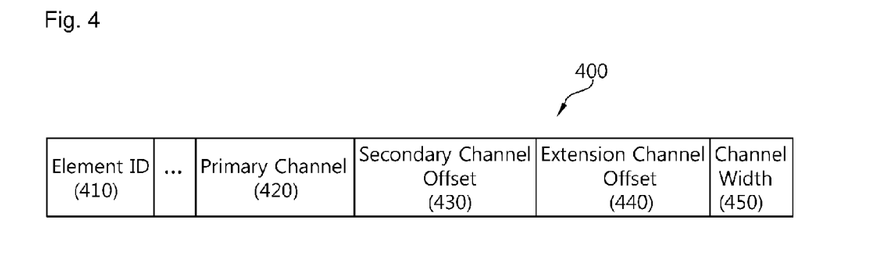
FIG. 4 illustrates an exemplary format of an operation element for setting up multiple channels.

FIG. 4 illustrates an exemplary format of an operation element for setting up multiple channels. An operation element 400 for setting multiple channels includes an element ID 410, a primary channel field 420, a secondary channel offset field 430, an extension channel offset field 440 and a channel width field 450. The element ID 410 is an identifier for identifying the operation element 400. The primary channel field 420 indicates the position of a primary channel in the available bandwidth of a system and can be represented as a channel number. The channel width field 450 represents a channel bandwidth supported by a STA or a channel bandwidth used for transmission. The STA can support at least one of bandwidths 20 MHz, 40 MHz, 60 MHz and 80 MHz.

The secondary channel offset field 430 indicates the offset of the secondary channel relative to the primary channel. The secondary channel offset field 430 can be configured as represented by Table 1.

TABLE 1

| Value | Name | Description |
| --- | --- | --- |
| 0 | SCN (No Secondary Channel) | No secondary channel is present. |
| 1 | SCA (Secondary Channel Above) | The secondary channel is above the primary channel. |
| 2 | SCB (Secondary Channel Below) | The secondary channel is below the primary channel. |

The extension field offset field 440 indicates the position of an extension channel relative to the primary channel and/or the secondary channel. The value of the extension channel offset field 440 can be set based on the primary channel, as represented by Table 2.

TABLE 2

| Value | Name | Description |
| --- | --- | --- |
| 0 | ECN (No Extension Channel) | No extension channel is present. |
| 1 | ECA (Extension Channel Above) | The extension channel is above the primary channel. |

TABLE 2-continued

| Value | Name | Description |
| --- | --- | --- |
| 2 | ECB (Extension Channel Below) | The extension channel is below the primary channel. |
| 3 | ECC (Extension Channel Cross) | The primary channel is in between the extension channels. |

Though Table 2 shows that the extension channel offset field 440 indicates the position of the extension channel based on the primary channel, the extension channel offset field 440 may indicate the position of the extension channel based on the secondary channel or based on a combination of the primary channel and the secondary channel.

The terms and values represented in Tables 1 and 2 are exemplary and those who skilled in the art can easily change the terms and values.

All the aforementioned fields are not included in the operation element 400. Some of the fields may be omitted or other fields may be added. For example, the operation element 400 may not include the secondary channel offset field 430 if the secondary channel is not used.

The operation element 400 may be included in at least one of a beacon frame, a probe response frame and an association response frame and transmitted from an AP to a STA. Above frames may be referred to section 7.2.3 of IEEE standard P802.11-REVma/D9.0 "Wireless LAN Medium Access Control (MAC) and physical layer (PHY) specifications" which is hereby incorporated by reference.

An AP that classifies 60 MHz, 80 MHz or wider bandwidth as a primary channel, a secondary channel and an extension channel and manages the channels is required to change a channel previously allocated thereto in consideration of channel status. For example, if considerable noise is generated or/and interference with other signals occurs in a subchannel used as a primary channel in the overall channel bandwidth, another subchannel is updated to the primary channel to efficiently manage a WLAN system.

Figure 5:
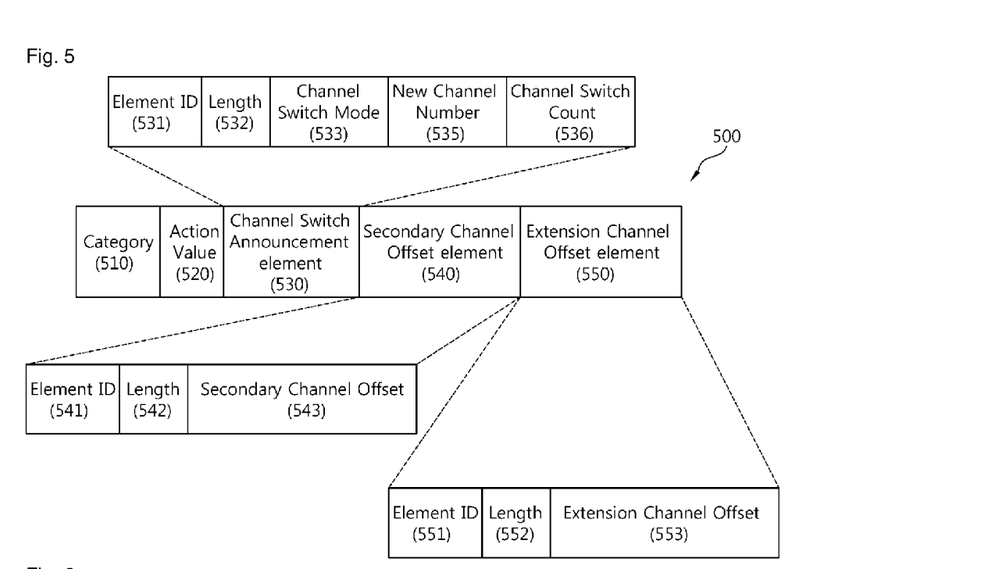
FIG. 5 illustrates an exemplary channel switch announcement frame according to an embodiment of the present invention.

FIG. 5 illustrates an exemplary channel switch announcement frame according to an embodiment of the present invention. A channel switch announcement frame 500 is used by an AP in a BSS or a STA in an IBSS to advertise when it is changing to a new channel. The channel switch announcement frame 500 includes a category field 510, an action value field 520, a channel switch announcement element field 530, a secondary channel offset element field 540, and an extension channel offset element field 550. The category field 510 may represent spectrum management. The action value field 520 may represent a channel switch announcement frame.

The channel switch announcement element field 530 includes an element ID 531, a length field 532, a channel switch mode field 533, a new channel number field 535 and a channel switch count field 536. The channel switch mode field 533 indicates any restrictions on transmission until a channel switch. An AP in a BSS or a STA in an IBSS may set the channel switch mode field 533 to either 0 or 1 on transmission. The channel switch mode field 533 set to 1 means that the STA in a BSS to which the frame containing the element is addressed transmits to further frames within the BSS until the scheduled channel switch. The channel switch mode field 533 set to 0 does not impose any requirement on the receiving STA. The new channel number field 535 is set to the number of the channel to which the STA is moving. The channel switch count field 536 either is set to the number of target beacon transmission times (TBTTs) until the STA sending the channel switch announcement element switches to the new channel or it set to 0. A value of 1 indicates that the switch shall occur immediately before the next TBTT. A value of 0 indicates that the switch occurs at any time after the frame containing the element is transmitted.

The secondary channel offset element field 540 includes an element ID 541, a length field 542 and a secondary channel offset field 543. The secondary channel offset element field 540 represents information on a new secondary channel when the secondary channel is changed to the new secondary channel. The secondary channel offset field 543 may be set as represented by Table 1.

The extension channel offset element field 550 includes an element ID 551, a length field 552 and an extension channel offset field 553 and represents information on a new extension channel when the extension channel is changed to the new extension channel. The extension channel offset field 553 may be set as represented by Table 2.

Figure 6:
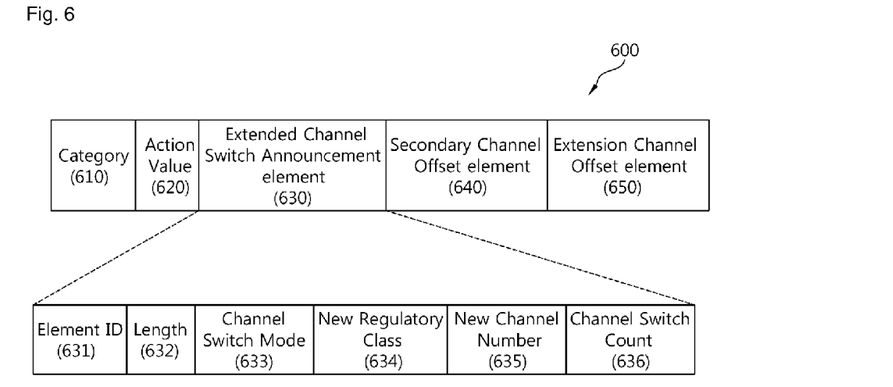
FIG. 6 illustrates an exemplary extended channel switch announcement frame according to an embodiment of the present invention.

FIG. 6 illustrates an exemplary extended channel switch announcement frame according to an embodiment of the present invention. An extended channel switch announcement frame 600 is used by an AP in a BSS or a STA in an IBSS to advertise when it is changing to a new channel or a new channel in a new regulatory class. The extended channel switch announcement frame 600 includes a category field 610, an action value field 620, an extended channel switch announcement element field 630, a secondary channel offset element field 640 and an extension channel offset element field 650.

Compared with the channel switch announcement frame 500 in FIG. 5, the extended channel switch announcement frame 600 includes the extended channel switch announcement element field 630 which further includes a new regulatory class field 634. The new regulatory class field 634 is set to the number of the regulatory class after the channel switch. A new channel number field 635 is set to the number of the channel after the channel switch. The channel number is a channel from the STA's new regulatory class.

The secondary channel offset element field 640 and the extension channel offset element field 650 can be set in the same manner in which the secondary channel offset element field 540 and the extension channel offset element field 550 of the channel switch announcement frame 500 shown in FIG. 5 are set.

A hierarchical channel access mechanism in a system including multiple subchannels will now be described. Hierarchical channel access represents an attempt to perform channel access according to multiple classes.

Figure 7:
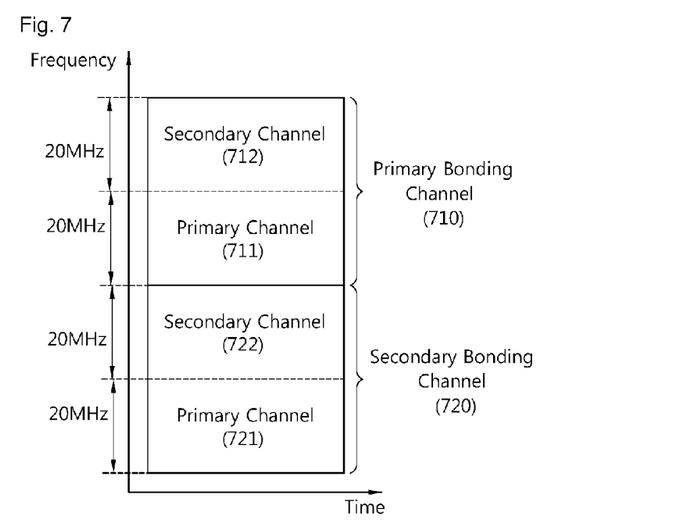
FIG. 7 illustrates exemplary channel allocation for hierarchical channel access.

FIG. 7 illustrates exemplary channel allocation for hierarchical channel access. The overall bandwidth of 80 MHz is divided into two bonding channels, that is, a primary bonding channel 710 and a secondary bonding channel 720. The primary bonding channel 710 and the secondary bonding channel 720 respectively have a bandwidth of 40 MHz and include two 20 MHz subchannels. The primary bonding channel 710 includes a primary channel 711 and a secondary channel 712 and the secondary bonding channel 720 includes a primary channel 721 and a secondary channel 722. The primary channels 711 and 721 and the secondary channels 712 and 722 are exemplary and their positions may be changed.

If a STA connected to a VHT system supports only a channel bandwidth of 20 MHz, channels are allocated such that the STA operates in a primary channel. The primary channel 711 of the primary bonding channel 710 or the primary channel 712 of the secondary bonding channel 720 may be allocated. Otherwise, the primary channel 711 of the primary bonding channel 710 may be given priority.

If the STA connected to the VHT system supports a channel bandwidth of 40 MHz, the channels are allocated such that STA operates in the primary bonding channel 710 or the secondary bonding channel 720. Otherwise, the primary bonding channel 710 may be given priority.

An AP sets channels that will be used by STAs based on channel bandwidths supported by the STAs. Channel set-up may be processed through an association response frame and channel switch may be processed through a channel switch announcement frame. For example, when a STA supporting a channel bandwidth of 80 MHz is connected to the AP, the AP may use the primary channel field 420 of the operation element 400 included in the association response frame for allocation of the primary bonding channel 710 and use the secondary channel offset field 430 for allocation of the secondary bonding channel 720. It is possible to add a new field to the operation element or change the existing fields in order to allocate the primary bonding channel 710 and the secondary bonding channel 720. Furthermore, the AP may send the channel switch announcement frame 500 or the extended channel switch announcement frame 600 to switch the primary bonding channel 710 and the secondary bonding channel 720 to each other. Accordingly, the AP can achieve load balancing for STAs on the channel bandwidth of 80 MHz.

Figure 8:
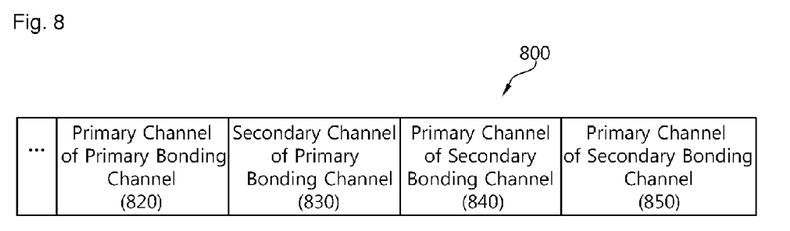
FIG. 8 illustrates an exemplary operation element.

FIG. 8 illustrates an exemplary operation element. An operation element 800 includes a primary channel field 810 of a primary bonding channel, a secondary channel field 830 of the primary bonding channel, a primary channel field 840 of a secondary bonding channel and a secondary channel field 850 of the secondary bonding channel. An AP may inform STAs which subchannel of which bonding channel is allocated through the operation element 800.

A STA supporting a channel bandwidth of 80 MHz (more specifically, a non-AP STA supporting VHT) may use four 20 MHz channels, two 40 MHz channels or a single 80 MHz channel. That is, both the primary bonding channel 710 and the secondary bonding channel 720 are allocated to the STA, and the STA may use the primary bonding channel 710 and the secondary bonding channel 720 as a 80 MHz channel or use one of the primary bonding channel 710 and the secondary bonding channel 702 as a 40 MHz channel. The STA may use channels based on CCA (Clear Channel Assessment) information.

Figure 9:
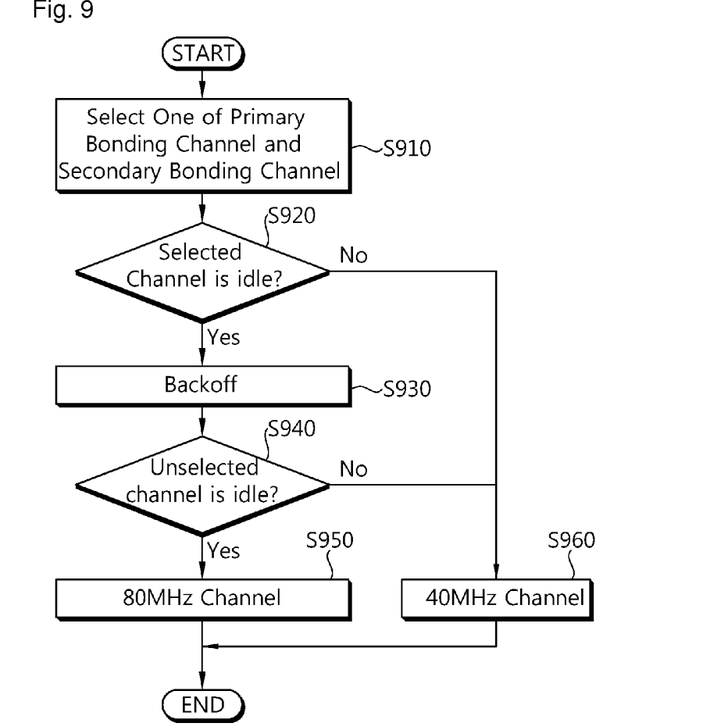
FIG. 9 is a flowchart showing a hierarchical channel access mechanism according to an embodiment of the present invention.

FIG. 9 is a flowchart showing a hierarchical channel access mechanism according to an embodiment of the present invention. The hierarchical channel access mechanism may be performed by a STA. A STA supporting a channel bandwidth of 80 MHz selects a primary bonding channel or a secondary bonding channel (S910). The STA confirms whether the selected bonding channel is idle (S920). When the selected bonding channel is idle, the STA performs backoff (S930). After a backoff timer is started, the STA confirms whether the unselected bonding channel is idle when the backoff timer is expired (S940). When the unselected bonding channel is idle, the STA transmits frames by using the two bonding channels, that is, a channel having 80 MHz (S940). When the unselected bonding channel is not idle, the STA transmits frame by using the selected bonding channel (S950).

If the STA supporting the channel bandwidth of 80 MHz wants to use a 40 MHz channel, the STA may confirm whether the channel is used as follows. The STA randomly selects one of the primary bonding channel and the secondary bonding channel. When the selected bonding channel is idle, the STA performs backoff. After the backoff timer is started, the STA confirms whether the secondary channel is idle when the backoff timer is expired. When the secondary channel is idle, the STA transmits frames by using the selected bonding channel. When the secondary channel is not idle, the STA transmits frames by using the primary channel.

Figure 10:
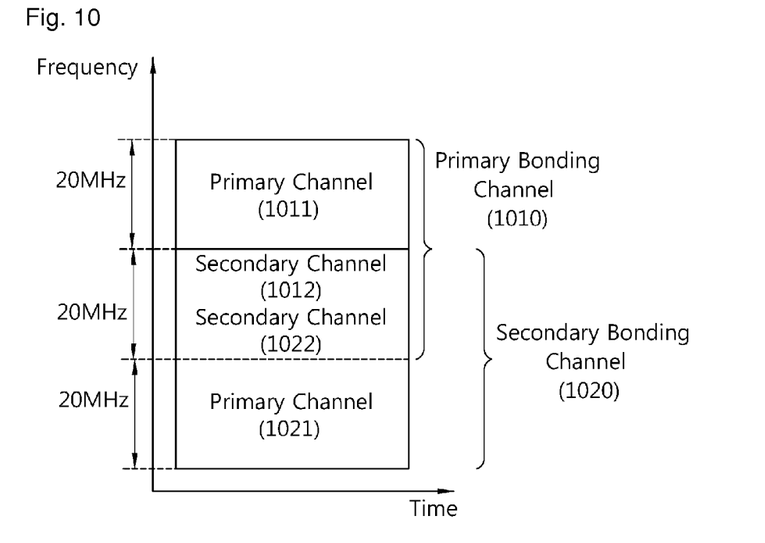
FIG. 10 illustrates an example of channel allocation for hierarchical channel access.

FIG. 10 illustrates an example of channel allocation for hierarchical channel access. A bandwidth of 60 MHz is segmented into two bonding channels, that is, a primary bonding channel 1010 and a secondary bonding channel 1020. The primary bonding channel 1010 and the secondary bonding channel 1020 respectively have a bandwidth of 40 MHz and include two 20 MHz subchannels. The primary bonding channel 1010 includes a primary channel 1011 and a secondary channel 1012 and the secondary bonding channel 1020 includes a primary channel 1021 and a secondary channel 1022. The secondary channel 1012 of the primary bonding channel 1010 and the secondary channel 1022 of the secondary bonding channel 1020 overlap each other.

If a STA connected to a VHT system supports only a channel bandwidth of 20 MHz, a channel is allocated to the STA such that the STA operates in a primary channel. The primary channel 1011 of the primary bonding channel 1010 or the primary channel 1012 of the secondary bonding channel 1020 may be allocated to the STA. Otherwise, the primary channel 1011 of the primary bonding channel 1010 may be given priority.

If the STA connected to the VHT system supports a channel bandwidth of 40 MHz, a channel is allocated to the STA such that the STA operates in the primary bonding channel 1010 or the secondary bonding channel 1020. Otherwise, the primary bonding channel may be given priority. The primary bonding channel 1010 and the secondary bonding channel 1020 cannot be simultaneously used because the primary bonding channel 1010 and the secondary bonding channel 1020 overlap each other.

An AP sets channels that will be used by STAs based on channel bandwidths supported by the STAs. Channel set-up may be processed through an association response frame and channel switch may be processed through a channel switch announcement frame.

A STA supporting a channel bandwidth of 60 MHz may select and use one of a 20 MHz subchannel, a 40 MHz channel and a 60 MHz channel based on CCA information. The STA supporting the channel bandwidth of 60 MHz selects a primary bonding channel or a secondary bonding channel. The STA confirms whether the selected bonding channel is idle. When the selected bonding channel is idle, the STA performs backoff. After a backoff timer is started, the STA confirms whether the unselected bonding channel is idle when the backoff timer is ended. When the unselected bonding channel is also idle, the STA transmits frames by using the two bonding channels, that is, a channel having a bandwidth of 60 MHz. When the unselected bonding channel is not idle, the STA transmits frames by using the selected 40 MHz bonding channel.

If the STA supporting the channel bandwidth of 60 MHz wants to use a 40 MHz channel, the STA confirms whether the channel is used as follows. The STA selects one of the primary bonding channel and the secondary bonding channel. When the primary channel of the selected bonding channel is idle, the STA executes backoff. After the backoff timer is started, the STA confirms the secondary channel of the selected bonding channel is idle when the backoff timer is ended. If the secondary channel is idle, the STA transmits frames by using the selected bonding channel. If the secondary channel is not idle, the STA transmits frame by using the primary channel.

A first channel is randomly selected from a plurality of narrowband channels. Alternatively, the first channel may be selected based on configuration information from an AP. When the first channel is idle, it is confirmed whether a second channel is idle after the lapse of backoff time. When the second channel is idle, frames are transmitted using the first and second channels. The second channel may be contiguous to the first channel, and thus a wideband channel can be supported by narrowband channels.

Figure 11:
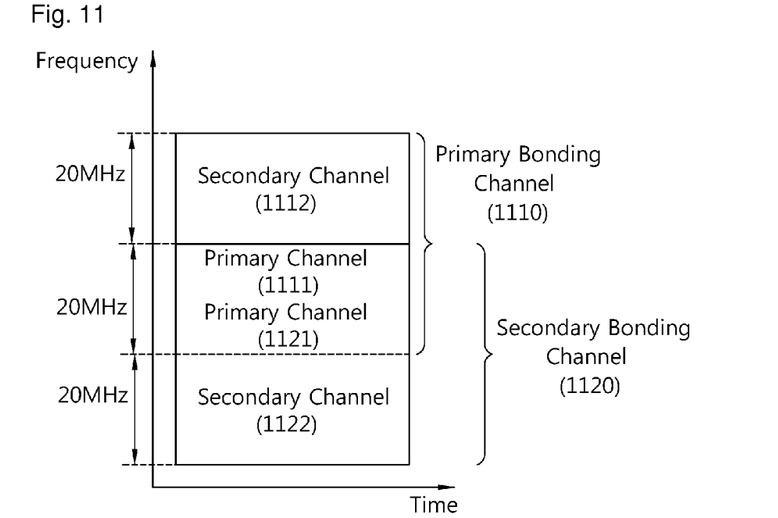
FIG. 11 illustrates another example of channel allocation for hierarchical channel access.

FIG. 11 illustrates another example of channel allocation for hierarchical channel access. A bandwidth of 60 MHz is segmented into two bonding channels, that is, a primary bonding channel 1110 and a secondary bonding channel 1120. The primary bonding channel 1110 and the secondary bonding channel 1120 respectively have a bandwidth of 40 MHz and include two 20 MHz subchannels. The primary bonding channel 1110 includes a primary channel 1111 and a secondary channel 1112 and the secondary bonding channel 1120 includes a primary channel 1121 and a secondary channel 1122. Compared with the embodiment shown in FIG. 10, the primary channel 1111 of the primary bonding channel 1110 and the secondary channel 1122 of the secondary bonding channel 1120 overlap each other. The aforementioned channel access mechanism may be used without being changed.

Figure 12:
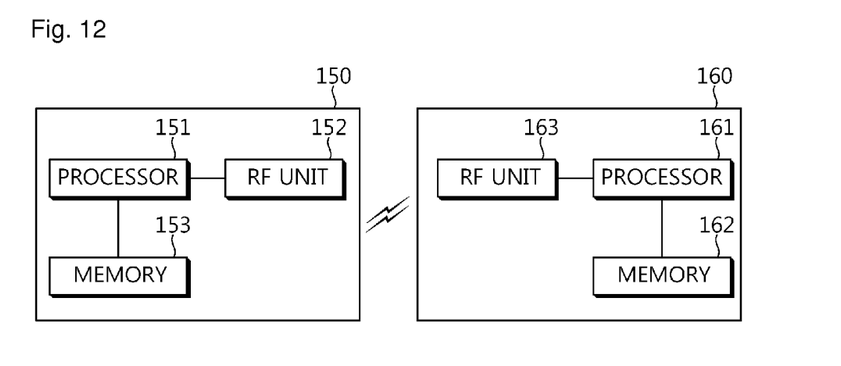
FIG. 12 is a block diagram of a wireless communication system to implement an embodiment of the present invention.

FIG. 12 is a block diagram of a wireless communication system to implement an embodiment of the present invention is implemented. An AP 150 includes a processor 151, a memory 152 and an RF (Radio Frequency) unit 153. The processor 151 implements a proposed function, process and/or method. Channel allocation and channel switch can be performed by the processor 151. The memory 152 is operatively connected to the processor 151 and stores information for operating the processor 151. The RF unit 153 is operatively connected to the processor 151 and transmits and/or receives RF signals. A STA 160 includes a processor 161, a memory 162 and an RF unit 163. The processor 161 implements a proposed function, process and/or method. The aforementioned channel access method can be implemented by the processor 161. The memory 162 is operatively connected to the processor 161 and stores information for operating the processor 161. The RF unit 163 is operatively connected to the processor 161 and transmits and/or receives RF signals.

The processors 151, 161 may include application-specific integrated circuit (ASIC), other chipset, logic circuit and/or data processing device. The memories 152, 162 may include read-only memory (ROM), random access memory (RAM), flash memory, memory card, storage medium and/or other storage device. The RF units 153, 163 may include baseband circuitry to process radio frequency signals. When the embodiments are implemented in software, the techniques described herein can be implemented with modules (e.g., procedures, functions, and so on) that perform the functions described herein. The modules can be stored in memories 152, 162 and executed by processors 151, 161. The memories 152, 162 can be implemented within the processors 151, 161 or external to the processors 151, 161 in which case those can be communicatively coupled to the processors 151, 161 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of accessing a channel in a wireless local area network, the method comprising:
   configuring, by an access point (AP), a first bonding channel and a second bonding channel, the first bonding channel including a first 20 MHz primary channel and a first 40 MHz secondary channel, and the second bonding channel including a second 20 MHz primary channel and a second 20 MHz secondary channel,
   determining, by the AP, whether the first 20 MHz primary channel or the second 20 MHz primary channel is idle; and
   transmitting, by the AP, data using the first bonding channel or the second bonding channel to a receiving station in a basic service set only after the AP determines that the first 20 MHz primary channel or the second 20 MHz primary channel is idle,
   wherein the first 20 MHz primary channel overlaps with the second 20 MHz primary channel,
   wherein the first 40 MHz secondary channel is adjacent to the first 20 MHz primary channel, but is not adjacent to the second 20 MHz secondary channel, and
   wherein transmitting the data includes:
      transmitting first data using the first bonding channel when the first 20 MHz primary channel and the first 40 MHz secondary channel are idle only after the AP determines that the first 20 MHz primary channel is idle; and
      transmitting second data using the second bonding channel when the second 20 MHz primary channel and the second 20 MHz secondary channel are idle only after the AP determines that the second 20 MHz primary channel is idle.

2. An access point device for accessing a channel in a wireless local area network, the device comprising:
   a radio frequency (RF) unit configured to transmit a radio signal; and
   a processor coupled with the RF unit and configured to:
      configure a first bonding channel and a second bonding channel, the first bonding channel including a first 20 MHz primary channel and a first 40 MHz secondary channel, and the second bonding channel including a second 20 MHz primary channel and a second 20 MHz secondary channel;
      determine whether the first 20 MHz primary channel or the second 20 MHz primary channel is idle; and
      cause the RF unit to transmit data using the first bonding channel or the second bonding channel to a receiving station in a basic service set only after the processor determines that the first 20 MHz primary channel or the second 20 MHz primary channel is idle,
   wherein the first 20 MHz primary channel overlaps with the second 20 MHz primary channel,
   wherein the first 40 MHz secondary channel is adjacent to the first 20 MHz primary channel, but is not adjacent to the second 20 MHz secondary channel, and
   wherein the RF unit is further configured to transmit the data by:
      transmitting first data using the first bonding channel when the first 20 MHz primary channel and the first 40 MHz secondary channel are idle only after the processor determines that the first 20 MHz primary channel is idle; and
      transmitting second data using the second bonding channel when the second 20 MHz primary channel and the second 20 MHz secondary channel are idle only after the processor determines that the second 20 MHz primary channel is idle.

* * * * *